United States Patent
Pittman et al.

[15] 3,641,427
[45] Feb. 8, 1972

[54] ELECTRIC FIELD SENSOR

[72] Inventors: Ed P. Pittman; Roy A. Stanford, both of Panama City, Fla.

[73] Assignee: The United States of America as represented by the Secretary of the Navy

[22] Filed: Sept. 24, 1969

[21] Appl. No.: 862,642

[52] U.S. Cl. ................................324/9, 340/4 E, 340/4 R
[51] Int. Cl. ..................................................H04b 13/02
[58] Field of Search...................................324/8, 9; 340/4 E

[56] References Cited

UNITED STATES PATENTS

| | | | |
|---|---|---|---|
| 3,361,957 | 1/1968 | Hings | 324/1 |
| 3,514,693 | 5/1970 | Cagniard | 324/9 |
| 3,265,972 | 8/1966 | Curry | 340/4 E |
| 3,273,311 | 9/1966 | Monroe et al. | 340/4 E |
| 2,992,325 | 7/1961 | Lehan | 325/28 |

Primary Examiner—Richard A. Farley
Assistant Examiner—H. A. Birmiel
Attorney—Louis A. Miller, Don D. Doty and William T. Skeer

[57] ABSTRACT

The invention is a method and means for sensing and measuring an electric field within sea water or any other environmental medium. It contains three pairs of diametrically opposed electric current sensing electrodes that are combined and configured in such manner as to form opposite faces of a cube. Each electrode is segmented to effect a predetermined mosaic pattern; and between each pair thereof, a differential amplifier, having an input impedance that is substantially equal to the operational environmental medium, is connected. A signal-processing system, including a telemetering link, a computer, and/or a readout, is connected to the outputs of the differential amplifiers.

15 Claims, 11 Drawing Figures

PATENTED FEB 8 1972 3,641,427

Ed P. Pittman
Roy A. Stanford
INVENTORS

BY

Dex D. Doty
Attorney

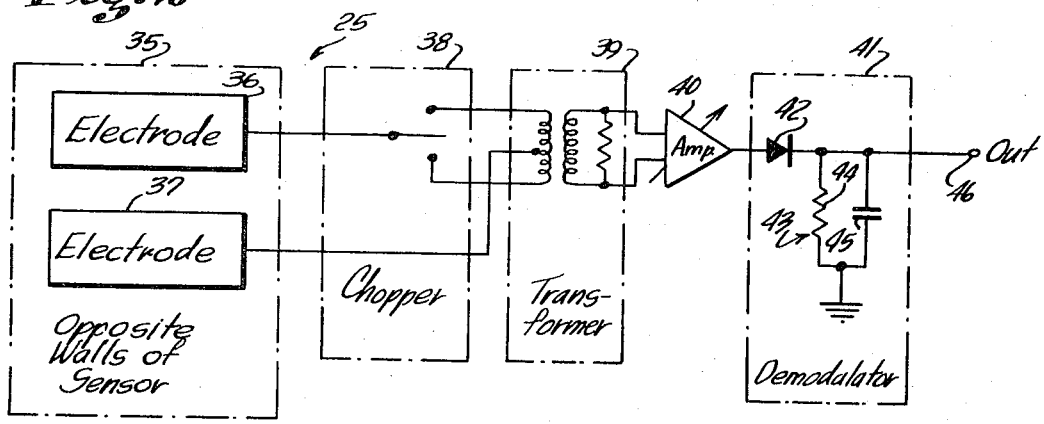
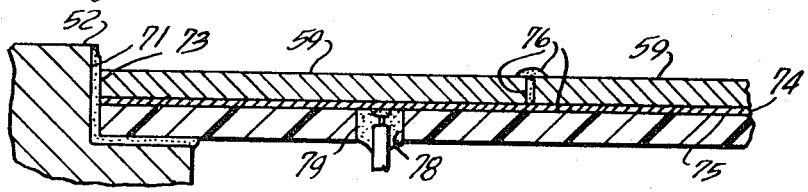
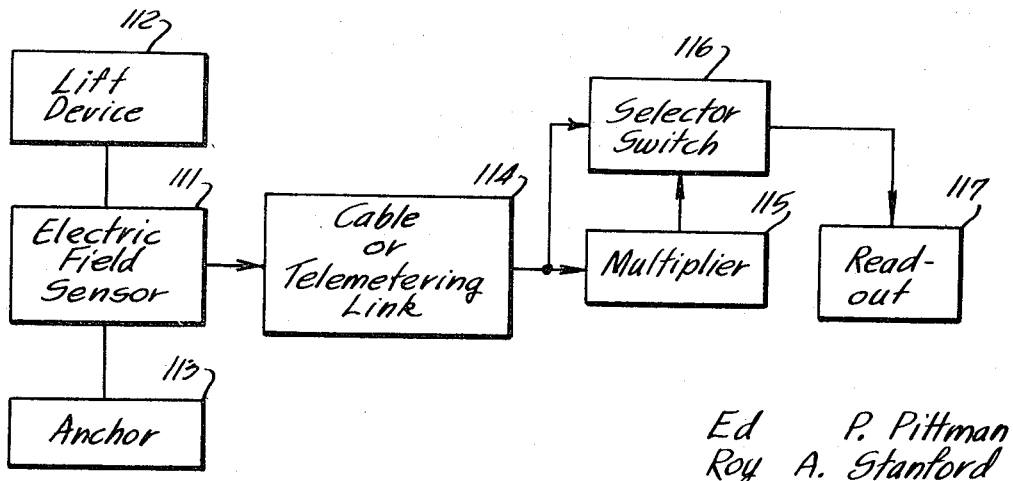
Ed P. Pittman
Roy A. Stanford
INVENTORS
BY
Don D. Doty
Attorney

PATENTED FEB 8 1972

Ed P. Pittman
Roy A. Stanford
  INVENTORS

BY

Dox D. Doty
  Attorney

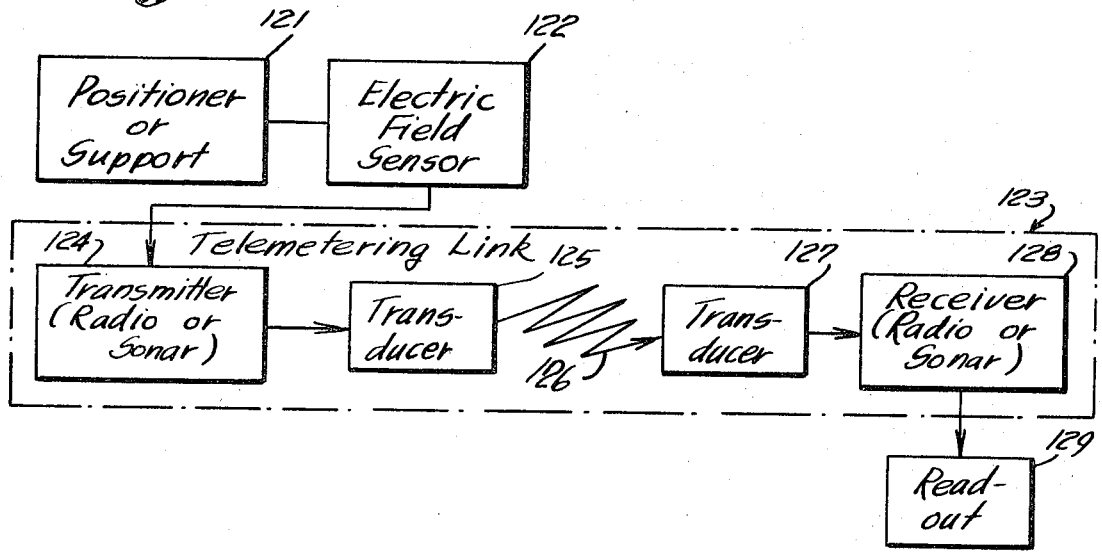
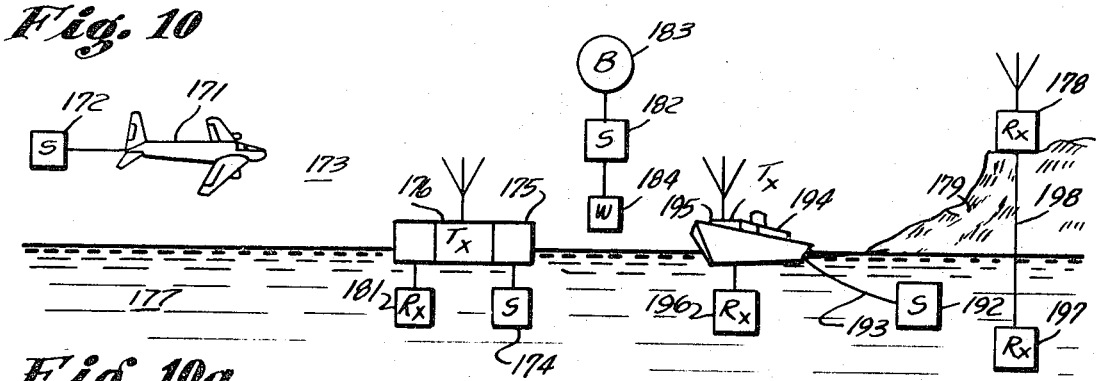
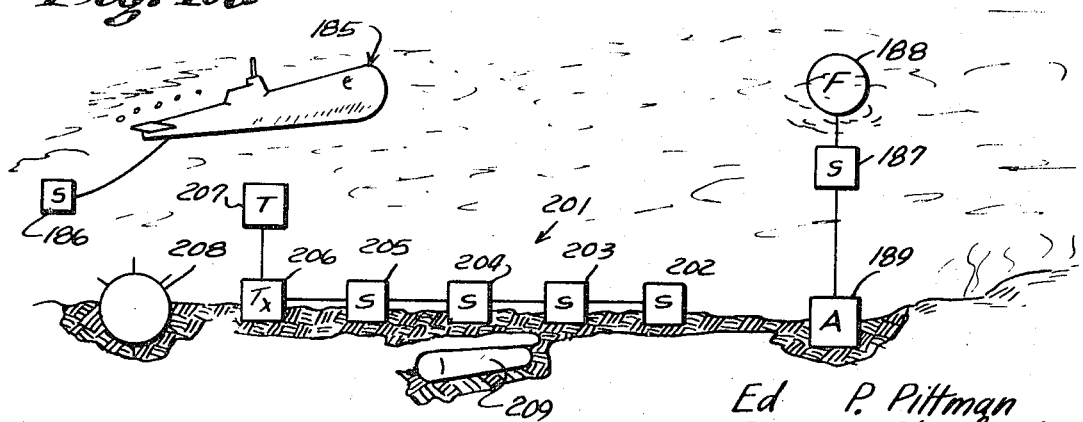
Ed P. Pittman
Roy A. Stanford
INVENTORS
BY
Don D. Doty
Attorney

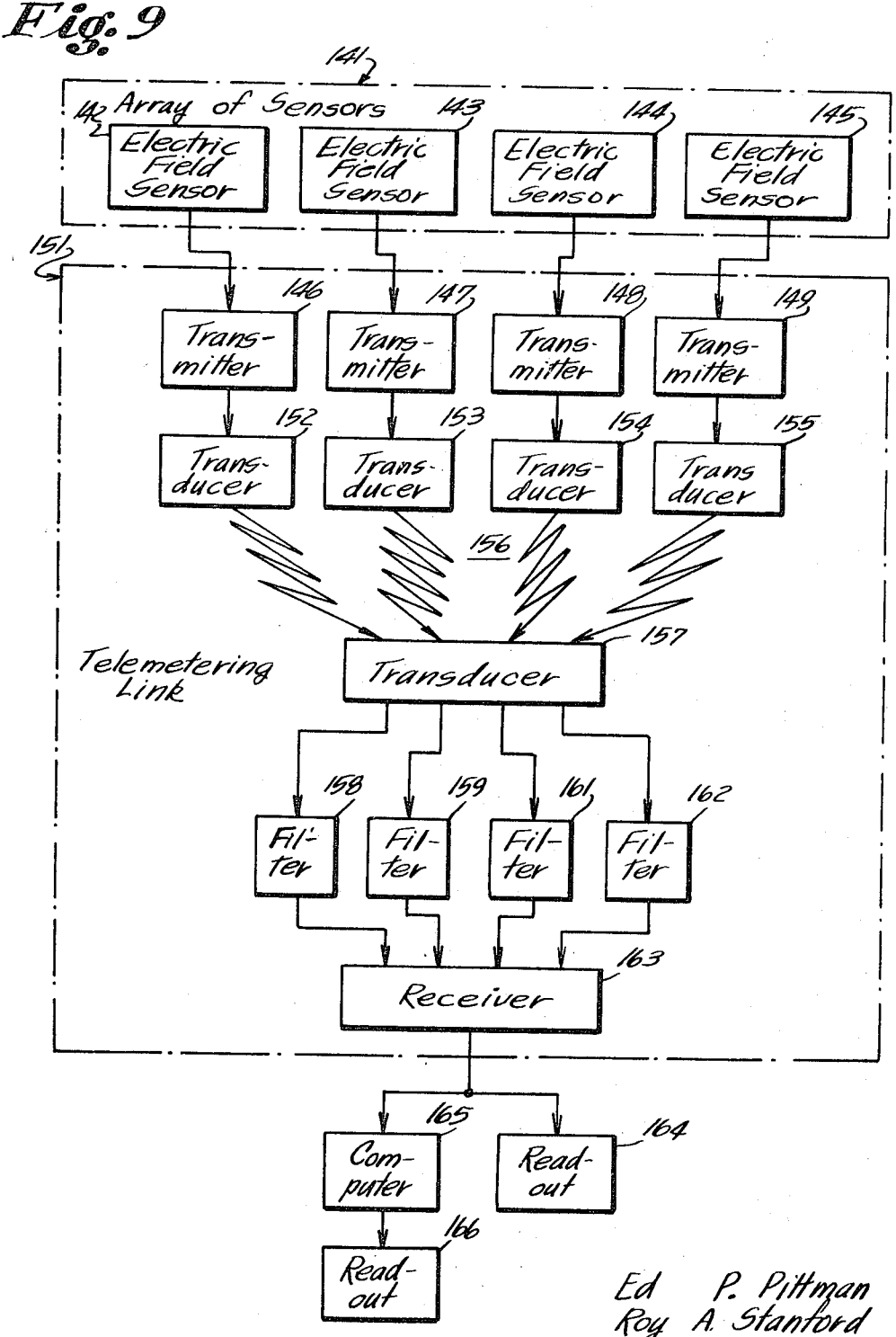

ELECTRIC FIELD SENSOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

Electric fields, and especially those in sea water, have heretofore been sensed and measured by means of pairs of potential difference electrodes which are connected to potentiometric instruments or very high impedance amplifiers or meters. In such instances, the difference between the electrode potentials is representative of the strength of the electric field in the direction paralleling an imaginary line between the electrodes. Although satisfactory for some purposes, such systems usually leave a great deal to be desired because of the high impedance of the normally small electrodes. Thus, accurate measurements may be obtained only if very little current is drawn from the electrodes. But to obtain sufficient signal power to operate amplifiers or meters, it has, in the past, been necessary to space the electrodes rather far apart—perhaps as far apart as tens or hundreds of meters—if it is desired to measure weak electrical fields.

Another disadvantage of the prior art systems is that they ordinarily require the potential-measuring array to be accurately laid out, with the potential sensitive electrodes rigidly mounted at fixed locations, and with the electrical conductors connecting the electrodes secured in such manner to prevent them from moving with respect to the earth's magnetic field. Moreover, to obtain measurements of the horizontal magnetic field components of the earth at the bottom of the sea, the electrodes and electrical conductors may have to be attached to the sea floor, an operation which is usually quite difficult, since it requires the use of divers. And, of course, obtaining electric current measurements at intermediate ocean depths becomes a formidable problem, indeed.

In addition to the above, the measurement of weak vertical electric field components of the earth in shallow water is frequently impossible by the prior art sensing techniques, because the required electrode separation to do so exceeds the water depth.

The subject invention overcomes most of the disadvantages of the prior art, in that it provides a simple, accurate, and convenient method and means for sensing electric currents—and, thus, electrical and electromagnetic fields—within any accessible environment, including the deep ocean and shallow water environments of the earth.

SUMMARY OF THE INVENTION

The present invention relates generally to measuring and testing instruments, and, in particular, it is a method and means for sensing and measuring the electric currents within an electric or electromagnetic field. In even greater particularity, the instant invention is an instrument or system for sensing and measuring the three orthogonal components of nonuniform electric fields in sea water.

Although as previously suggested, the system constituting this invention may be used in any suitable environmental medium for sensing any electric currents or electric fields—such as electrostatic and electromagnetic fields—be they of the earth or otherwise, for the purpose of being as brief as possible, the type which is used to sense and measure electric fields in water will be described herein, with the understanding that the invention is not intended to be limited thereto. Obviously, the making of the transition from one environmental medium to another would be merely a matter of making design choices to properly design the invention therefor, the making of which would be well within the purview of one skilled in the art having the benefit of the teachings presented herewith.

It is, therefore, an object of this invention to provide an improved current-sensing instrument.

Another object of this invention is to provide an improved method and means for sensing electric fields within any appropriate environmental medium.

Another object of this invention is to provide an improved system for continuously sensing, measuring, and indicating the three orthogonal direction components of nonuniform electric fields in water, sea water, the atmosphere, or any other aqueous or subaqueous medium, as well as in space or any other medium or location physically feasible.

Still another object of this invention is to provide an improved method and means for continuously sensing, measuring, and indicating any anomaly or change occurring within an electric field that is caused by an object foreign thereto passing therethrough or existing therein.

A further objective of this invention is to provide an electric field sensing and indicating system which may be read out either at a location that is contiguous with the sensor or at a location that is remote therefrom.

A further object of this invention is to provide an electric current, electric field sensing means that may be mounted on or in, carried by, or connected to, the sea floor, an intermediate water depth in any body of water (including the deep and shallow ocean) a buoy, a float, a balloon, a ship, a submarine boat, a tether, an anchor, any carrier vehicle, or any suitable combination thereof, as desired for any given operational purpose, or as necessary during any given operational circumstances.

Another object of this invention is to provide an electric field sensing and indicating means that may be timely placed, disposed, launched (either manually or by suitable machine) from any carrier vehicle or stabilized on stationary platform.

Another object of this invention is to provide a more sensitive and accurate method and means for constitutes measuring, and reading out electric currents and fields at locations which would not otherwise be accessible or at least very difficult to get to.

Another object of this invention is to provide an improved method and means for detecting and identifying objects or materials located in sea water or any other environmental medium.

Still another object of this invention is to provide an improved intrusion sensing and indicating system.

It is also an object of this invention to provide an improved method and means for measuring an electric field as substantially a point location or within such a small area that relatively nonuniform fields may be accurately measured.

Another object of this invention is to provide an electric current and field sensing means that is easily and economically manufactured, maintained, and operated.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 2 is a schematic diagram of a differential amplifier of the type incorporated in the invention;

FIG. 4 is a cross-sectional view taken at 4—4 of FIG. 3;

FIG. 6 is a block diagram of a system which may incorporate the electric field sensor portion of the invention to an advantage;

FIG. 7 is another embodiment of a system constituting the subject invention;

FIG. 9 illustrates, in block diagram form, a system for sensing the electric fields or change in electric fields which occur due to the presence of passing of, or intrusion of, an object which has an effect thereon;

FIGS. 10 and 10a are quasi-pictorial views of various and sundry applications to which the subject invention can be put to an advantage.

DESCRIPTION OF THE PREFERRED EMBODIMENTS

Figure 1:
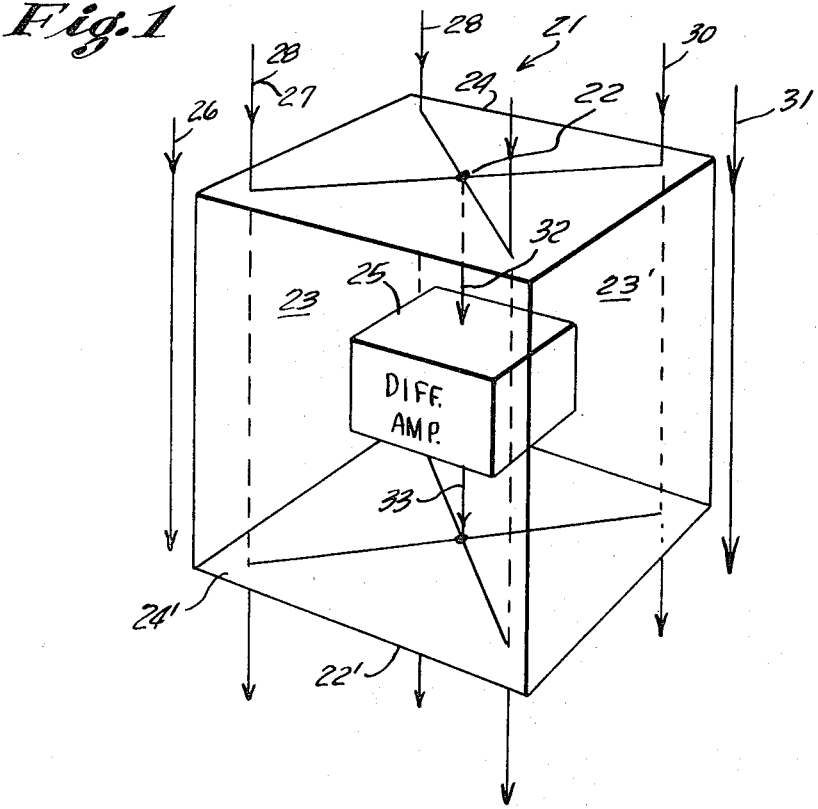
FIG. 1 is a schematic illustration of the theory of operation of the invention.

Referring now to FIG. 1, there is shown a schematic representation of the invention 21. As may readily be seen, it is preferably cubic in shape and, thus, contains six sides, respectively designated by reference numerals 22 and 22', 23 and 23', and 24 and 24', with the numeral and numeral primed representing the opposite sides thereof.

For the purpose of briefly disclosing the theory of operation, only the upper and lower sides of the cube, their associated electronics, and their interaction with electric currents or fields in the ambient environment will be discussed.

The aforesaid sides of cube 21 actually constitute electrodes of special construction, which will be discussed subsequently. Between each pair of oppositely disposed electrodes is connected a differential amplifier, the input impedance of which should be designed to be substantially equal to that of the environmental medium in which the invention is intended to operate. Hence, for example, predesigned differential amplifier 25 is connected between oppositely disposed electrodes 22 and 22'. Amplifier 25 is shown as being located within the cubic structure, and for most practical purposes such location is preferred; however, it should be understood that it may be located at any suitable place, as long as the impedance thereof, including that of the electrical conductors thereto and therefrom, is substantially the same as the electrical impedance of the environmental medium in which the invention is being used.

Once the invention is placed in its field-sensing position, representative vertical currents or electric field components 26 through 31 will, for example, travel as shown with respect thereto. Those, such as 26 and 31, which miss the sensor will continue on their way without being disturbed; but those, such as 28 through 30, which impact upon electrode 22 travel toward and along electrical conductor 32 to an appropriate input of differential amplifier 25. After suitable amplification—that is, amplification that is sufficient to make the total current flow between electrodes 22 and 22' equal to that which would occur had not the subject invention been present—they continue on through electrical conductor 33 to electrode 22' and back into the ambient environmental medium.

Of course, the other two pairs of electrodes and their respective amplifiers function according to the same principle but with respect to currents and field components orthogonal thereto.

FIG. 2 depicts a representative circuit which may be used as differential amplifier 25, if so desired; however, it should be understood that any amplifier that is designed to meet the impedance and amplification requirements may be substituted therefor. Obviously, it would be well within the purview of one skilled in the art having the benefit of the teachings presented herewith, to make such selection or design such amplifier. In FIG. 2 the opposite walls 35 of the sensor includes electrodes 36 and 37, with the outputs thereof connected to the inputs of an electrical chopper 38. And the outputs of chopper 38 are connected through an impedance-matching transformer 39 to an adjustable gain internal amplifier 40 of any appropriate conventional design. The output of amplifier 40 of any appropriate conventional design. The output of amplifier 40 is connected to a demodulator 41 which includes a diode detector 42 and a filter 43 containing a parallel-connected resistor 44 and capacitor 45 connected between the output of diode 42 and ground. The output of demodulator 41 is taken from the cathode of diode 42 and is coupled to an output terminal 46.

Because the impedance and amplification characteristics are exceedingly important to the optimum operation of the invention, it is again emphasized that they should be so designed that the current passing therethrough would not meet any impedance other than that which is substantially equal to that of the environmental medium in which the invention is operating. For instance, if electric currents or fields are being sensed and measured in sea water, the amplification and impedance characteristics should be such that the components thereof will pass through the sensor just as if it were not present, thereby preventing any loss or attenuation thereof due to the sensor taking part in the measurement thereof.

Figure 3:
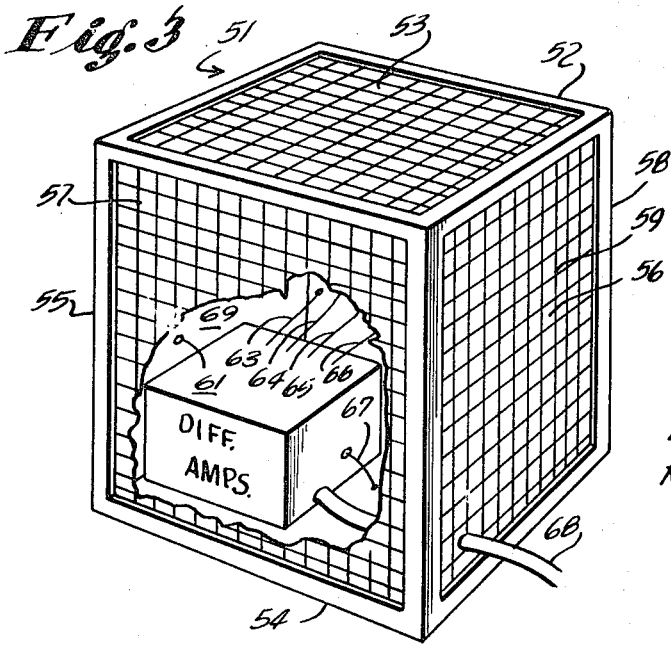
FIG. 3 is pictorial view, with parts broken away, of the cube structure of the invention.

Referring now to FIG. 3, a preferred structural embodiment 51 of the sensor portion of the invention is shown as having a cubic shaped, electrically nonconductive box or box frame 52 which is preferably one meter in dimension and to which electrodes 53 through 58 are mounted on the sides thereof in such manner that electrodes 53 and 54, 55 and 56, and 57 and 58 form substantially parallel opposite faces thereof. The geometrical configuration of frame 52 is, as previously mentioned, preferably a cube with insets or angular cuts as shown. However, it should be understood that it may be designed to have any configuration that is necessary to physically fit in any given location or confinement or that will enable it to sense and measure the electric current and field, regardless of its physical disposition. Each side or electrode is covered with a mosaic of segments 59 that are made of any suitable electrode material. Of course, each pair of opposite electrodes has its low-impedance differential amplifier electrically connected therebetween. They may be housed in any appropriate encasement 61, preferably located within the cubic structure per se. Electrical conductors 62 through 67 respectively effect the aforesaid electrical connections between the electrode pairs and their respective amplifiers, and insulated lead wires 68 are, of course, connected to any desired utilization apparatus.

Although this particular preferred embodiment of sensor 51—which, of course, is water and/or airtight—is shown as being hollow (and thus possibly filled with air), it should be understood that it may be filled with oil, plastic, or any suitable substantially incompressible potting material 69 that will make it strong enough to prevent it from collapsing from the ambient pressure to which it might be exposed if it were located in deep water.

More explicit descriptions of the cube structure is illustrated in FIG. 4. Using, as appropriate, tee same reference numerals as were used in conjunction with FIG. 3, frame 52 is shown as having a right-angle cut 71 in which a rigid, electrically nonconductive plate 72 is mounted and secured to frame 52 as by any conventional appropriate electrically nonconductive cement 73. A sheet of copper foil 74 is mounted or bonded on plate 72 in any suitable manner, say, as by any appropriate cement 75, and the aforesaid segments 59 are, likewise, mounted on and secured to foil 74, as by any suitable electrically conductive cement 76. Electrode segments 59 may, of course, be made of any appropriate electrically conductive electrode material—such as, for example, copper or aluminum—and they are electrically interconnected by the aforesaid electrically conductive cement 76, which also tends to be extended therebetween. Cement 76 is used in such manner as will provide sufficient bonding strength between foil 74 and each segment; thus, it may, on occasion, be preferable to allow it to overlap the internal surface of segments 59, as shown in FIG. 4. On the other hand, if it is desirable to have the outer surface or face of the mosaic electrode flat or relatively smooth, any excess of cement may be removed to make it flush therewith.

The electrode segments, being electrically interconnected, in combination effect the respective electrodes of the invention. They are, likewise, connected through foil 74 to insulated wire 77 which is soldered to foil 74. Because wire 77 extends through a hole 78 in nonconductive plate 72, it is held firm therein by a nonconductive cement 79 that effectively completes the insulation thereof while, at the same time makes a seal, such as a watertight seal, thereat. Of course, the entire structure of the cubic sensor is such that the inside thereof is completely insulated from the outside thereof. Hence, it is waterproof and/or airtight and facilitates the inclusion of the electronics package—including amplifiers, power supplies, batteries, readouts, recorders, telemetering equipment—or any other desired apparatus, equipment, or instrumentation—which, under certain circumstances, would be necessary to make it a self-contained unit.

Figure 5:
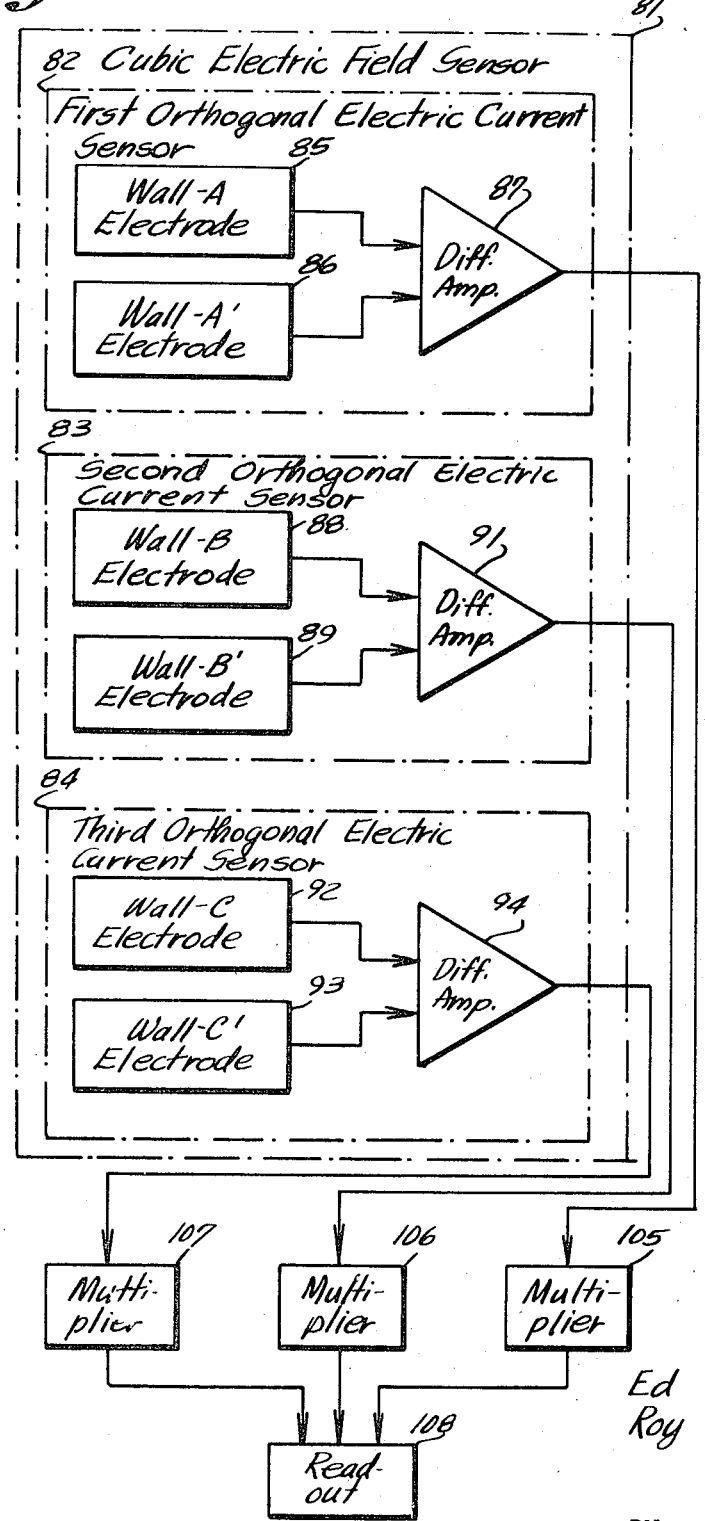
FIG. 5 is a block diagram of a preferred embodiment of the invention.

Referring now to FIG. 5, a generalized teaching of the system comprising the invention is presented which includes a cubic electric field sensor 81 that contains a trio of orthogonal electric current sensors 82, 83, and 84. First orthogonal electric current sensor 82 contains a wall-A electrode 85 and a wall-A' electrode 86 which is diametrically opposed to wall-A electrode in actual structural configuration. Electrodes 85 and 86 are electrically connected to the inputs of a differential amplifier 87 that, insofar as it is possible, has an input impedance that is substantially identical to the impedance of the environmental medium for the distance between said electrodes. Second orthogonal electric current sensor 83 contains a wall-B electrode 88 and a wall-B' electrode 89 which is diametrically opposed to wall-B electrode 88, and both of which are structurally disposed to make 90° angles, respectively, with electrodes 85 and 86. Electrodes 88 and 89 are electrically connected to the inputs of a differential amplifier 91 that also, insofar as it is possible, has an input impedance that is substantially identical to the impedance of the environmental medium for the distance between electrodes, like that of differential amplifier 87. Third orthogonal electric current sensor 84 includes a wall-C electrode 92 and a wall-C' electrode 93 that is diametrically opposed to wall-C electrode 92, and both of which are structurally disposed to make 90° angles, respectively, with electrodes 85, 86, 88, and 89. Electrodes 92 and 93 are electrically connected to the inputs of another differential amplifier 94 that is similar to amplifiers 87 and 91, in that it, too, insofar as it is possible, has an input impedance that is substantially equal to the impedance of the environmental medium for the distance between electrodes.

Some environments—such as, for example, in air or in space—have inherent impedances which are very high and perhaps even approach infinity. Thus, it may not be possible to design differential amplifiers 87, 91, and 94 to have an input impedance which is comparable thereto. In such instance, they should be designed to have an input impedance which is equal to the conjugate of the complex number of the impedance thereof. So doing, of course, causes the imaginary number portion thereof—representing the inductance or capacitance vector thereof—to be cancelled out, leaving only the resistance value thereof. When the invention is intended to be used in water or sea water, this may be effected within the differential amplifiers themselves, thereby obviating the need for further signal processing for such purpose. But in air or other environmental mediums, it may be necessary to compensate of the lack of true impedance matching of the input impedance of the amplifiers and the impedance thereof, in order to provide optimum operation and accuracy. This compensation is performed by a plurality of multipliers 105, 106, and 107 respectively connected to the outputs of amplifiers 87, 91, and 94. Ordinarily, said multipliers should be so designed as to multiply by two; however, it should be understood that they may be designed to multiply by any given factor that will cause the desired information to be read out.

The outputs from multiplier 105 through 109 are each connected to the respective inputs of a conventional readout 108 which is constructed and calibrated in such terms as will enable it to read them out separately, in concert, or in any desired resolution or combination.

FIG. 6 depicts another system in which a sensor 111, similar to those disclosed in FIGS. 1 through 5, is incorporated to an advantage, in order to effect an improved electric, electrostatic, or electromagnetic current or field measuring instrument. A lift device 112 is connected by any suitable means to sensor 111 for the support thereof. Likewise an anchor 113 is connected by any suitable means to sensor 111 to help hold it in place. Lift device 112 and anchor 113 vary in construction, depending on the operational medium. Thus, if the operational medium is sea water, lift device 112 may be a float having a predetermined buoyancy, and anchor 113 may be a weight, hook, or the like. If the medium is air, lift device may, for instance, be a balloon or aircraft, and anchor 113 may be any conventional position controller, weight, or the like. Obviously, the skilled artisan could easily make the proper choice thereof for any given medium, if he had the benefit of the teachings presented herein.

A cable or other telemetering link 114 which communicates the data signal from electric field sensor 111 is connected between the output thereof and the respective inputs of a multiplier 115 and a selector switch 116. The output of multiplier 115 is connected to another input of said selector switch, and the output thereof is connected to the input of any appropriate readout 117 calibrated to indicate and/or record the aforesaid data signal in any preferred terms.

FIG. 7, like FIGS. 5 and 6, also shows a particular structure which includes the subject invention to an advantage, and in this particular instance is a system which contains a positioner or support 121 which may be of any suitable variety that is called for by the operational circumstances or medium. Hence, positioner or support 121 may be a platform in space, in the atmosphere, on the surface of the sea, or even under the sea. As a matter of fact, it may also be mounted on land, as well. The specific criterion that must be followed, of course, is that it will support and hold the electric field sensor 122 attached thereto for the purpose of enabling it to sense electric currents and fields at some predetermined place.

The output of electric field sensor 122 is coupled to the input of a telemetering link 123 and, in this particular instance, is connected to the input of a radio or sonar transmitter 124 included therein. The output of transmitter 124 is connected to the input of a transmitting transducer 125 which, obviously, must be designed for the transmission of either electromagnetic signal energy or acoustical signal energy, depending upon whether transmitter 124 is a radio or sonar system.

Transducer 125 broadcasts its output signal 126 throughout whatever medium it happens to be located in, and a receiving transducer 127 picks up said signal because it is, likewise, disposed for reception thereof within said operational medium.

The output of transducer 127 is connected to a radio or sonar receiver 128, the output of which, in this particular case, constitutes the output of telemetering link 123. Again, it should be understood that receiving transducer 127 should be so designed as to be complementary with the aforementioned transmitting transducer 125 and should be responsive to either electromagnetic energy or acoustical energy, depending on whether or not receiver 128 was a radio or a sonar receiver.

The output from receiver 128, and hence, the output from telemetering link 123 is connected to the input of any appropriate readout 129 which is useful for its intended purposes. Of course, readout 129 may be either an indicator or a recorder or both, and it may be calibrated in any terms that makes the data signal read out thereby intelligible to a human or other operator.

Figure 8:
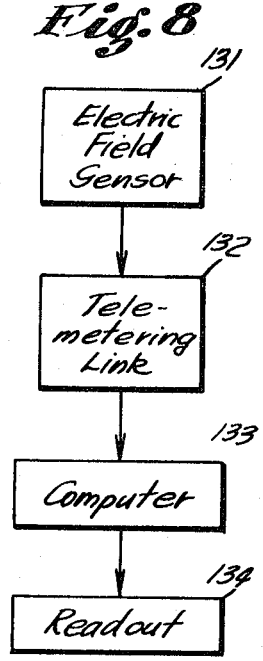
FIG. 8 depicts still another system arrangement which incorporates the invention.

The system of FIG. 8 comprises a very simple disclosure of another preferred method and means for sensing and measuring electric fields. Incorporated therein is an electric field sensor 131 which, for example, may be similar to that disclosed in FIG. 3. The output from electric field sensor 131 is connected through an appropriate telemetering link 132 to the input of a computer 133 for reasons which will be disclosed subsequently in conjunction with the discussion of the operation of this particular system. The output of computer 133 is connected to the input of a suitable readout 134.

On various and sundry occasions it is desirable and perhaps even necessary that the subject invention be employed as a method and means for detecting and measuring the deviation or change in the earth's electric field within a given area. For this purpose, the system of FIG. 9 has been invented, and as may readily be seen therein, it contains an array of sensors 141 which includes electric field sensors 142 through 145. Of course, said array of sensors may be disposed at any suitable location on land, on the surface of the sea, on the sea floor, at some intermediate position within the sea, in the atmosphere, or in space, as warranted by the information desired within any particular one thereof. Hence, it should be understood that the geometrical configuration of the electric field sensor array is not intended to be limited but may be such as is necessary during any given operational circumstances. The outputs from electric field sensors 142 through 145 are respectively connected to the inputs of a like plurality of transmitters 146 through 149, the inputs of which constitute the input of a telemetering link 151. The outputs of transmitters 146 through 149 are, likewise, respectively connected to the inputs of a like plurality of transducers 152 through 155 which broadcast signals in accordance with their inherent nature throughout the environmental medium 156 in which communication happens to be the most easily effected. A receiving transducer 157, adapted for receiving the energy broadcast by the aforesaid transducer 152 through 155, is likewise disposed within medium 156. The outputs thereof are connected through a plurality of filters 158, 159, 161, and 162 which are respectively tuned in such manner that each passes only the data signals sensed by the aforementioned electric field sensors 142 through 145. In other words, the aforesaid transmitters 146 through 149 are tuned at predetermined frequencies respectively and, thus, filters 158 through 162 are likewise tuned for the reception and passing of the respective signals therefrom. The outputs of filters 158 through 162 are connected to the inputs of a receiver 163, the output of which constitutes the output of the aforesaid telemetering link 151.

The output of receiver 163 is directly connected to the input of a readout 164, which may be calibrated in any desired terms. Receiver 163, likewise, has its output connected to a computer 165 which may be so designed as to perform any mathematical signal processing of the data signal received thereby to put the intelligence information contained therein into whatever form would be intelligible to a human or other operator. For example, computer 165 may be used as a continuous resolver for calculating the magnitude and direction of the electric fields being sensed by sensors 142 through 145 or their respective deviations which occur as a result of an intrusion of some foreign object within the earth's electric or electromagnetic fields within the area encompassed array 141. The output of computer 165 is connected to the input of a readout 166, which may be any suitable readout similar to any of the aforementioned readouts.

It would appear to be noteworthy at this particular time that, with the exception of the aforementioned electric field sensors, all of the elements of this invention which have been disclosed herein are well known and conventional per se. It is, therefore, to be understood that it is their unique interconnections and interactions with the aforesaid sensor or sensors and with each other that constitutes the subject invention and causes the improved result effected to be produced thereby.

MODE OF OPERATION

The operation of the invention will now be discussed briefly in conjunction with all of the figures of the drawing.

As previously suggested, the potential difference between a pair of electrodes disposed within a predetermined environmental medium is proportional to the strength of the electric field within said medium in the direction of an imaginary line drawn between them. However, in order to accurately measure said potential difference or the electric current flowing between the electrodes as a result of said potential difference, it is absolutely necessary that the impedance of the measuring instrument does not take part in the measurement process. In other words, there must be no power loss within the measuring instrument itself as a result of its effectively acting as a circuit impedance that is in parallel with impedance of the current path between the electrodes during the measuring process. But, in order to prevent such action from occurring, two things must be done: (1) the medium within which the electric current or field is being measured must be removed from between the electrodes, so that no current path exists therein along the imaginary line that is the shortest current path between the electrodes; (2) a current sensor which has an internal impedance that is equal to that of said environmental medium must be substituted therefor. Hence, when in a field-sensing position, the sensed current flows into one electrode, through the current sensor, and out the opposite electrode, and this occurs as a result of an electric field being present. Moreover, under such circumstances, said current is measured without the field causing it being changed or modified in a deleterious manner by the internal impedance of the measuring instrument; therefore, it is indicative of the actual strength thereof.

As shown in FIG. 3, the vectorial components of any electric field present are measured in three orthogonal directions. Furthermore, the sensor itself is preferably cubic in shape with the linear dimensions preferably equaling 1 meter.

Electrodes 53 through 58 are constructed with mosaic segments on the outside in order to improve the signal-to-noise ratio of the entire sensor. The supporting theory for so doing is presented as follows:

If an electrode surface area is considered to be composed of a large number of incremental areas $\Delta A$, and each $\Delta A$ area is a source of random noise, then the total noise current flowing therefrom through the differential amplifier is the vector sum of the currents from all $\Delta A$ areas in one electrode minus the vector sum of all the $\Delta A$ currents in the other coacting electrode. If the $\Delta A$ noise source areas are all statistically similar and mutually independent, then the vector sum is the square root of the sum of the squares of the individual source areas, and the total noise is proportional to the square root of the electrode area or the first power of the basic dimension of the cube. The electrode noise power is unaffected by the separation between two electrodes, but if the $\Delta A$ noise sources are mutually dependent, then the total noise is proportional to the electrode area or the square of the basic dimension of the cube.

The signal current through the differential amplifier due to an electric field in water, for example, is proportional to the electrode area or the square of the basic dimension of the cube. The signal voltage across the input terminals of the amplifier is directly proportional to the electrode separation distance or the first power of the basic dimension. The signal power, which is proportional to the product of the signal voltage and current, is, therefore proportional to the third power of the basic dimension. The signal-to-noise ratio and threshold sensitivity are then proportional to the square of the basic dimension if the $\Delta A$ areas are independent, and they are proportional to the first power of the dimension if they are dependent.

But it has been found that the magnitude, distribution, and mutual dependence of the individual noise areas depend upon electrode material and construction; hence, a considerable degree of mutual independence of individual noise sources may be assured by constructing the outer surfaces of the electrodes as mosaics of many individual segments. The segments obtained from a single manufacturing batch or run should be evenly distributed between the two electrodes of a coacting pair of electrodes, in order to optimize the effects of using such an electrode fabrication technique. In any event, the electrode construction shown in FIGS. 3 and 4, when combined with their associated components, effect a considerably improved electric field sensor which ostensively is an advancement in the art.

A further reduction in signal-to-noise ratio is effected in the subject device because it permits the inclusion of differential amplifiers having very low input resistance—for example, approximately one-fourth ohm for a 1-meter cube for sea water—and results, therefore, in a much lower level of amplifier noise. It has been determined that the amplifier noise is typically reduced by as much as 1,000 times or greater. However, for optimum overall operation, the design choice of amplifier input impedance is contingent upon the operational medium within which it is working, and it should be substantially comparable thereto. Of course, as suggested above, for sensing electric fields in water or sea water, the amplifier input impedance would be very low, thereby improving the signal-to-noise ratio of the sensor.

A secondary effect contributing to the reduced noise in the invention is the fact that many of the individual noise sources inherent in electrodes are of relatively high impedance. When a pair of electrodes is connected through a low-resistance amplifier circuit, the noise sources caused by minute impurities in the electrode materials are rapidly dissipated, and the noise level is substantially less than that resulting from the same pair of electrodes connected through a high-impedance circuit.

In order to detect and measure all of the components of an electric field, the subject sensor is built with a cubic shape, the area of each electrode of which is 1 square meter. Opposing sides of the cube constitute the coacting electrodes and, hence, it may readily be seen that an electric field is, for all practical purposes, sensed at a point with respect to three mutually perpendicular directions. Thus, the three vector components of any field are measured and may be appropriately resolved into its magnitude and direction by associated apparatus, if so desired.

In actual practice, the sensor is placed in the environmental medium where the electric field is to be measured. The various and sundry places and the means for so doing will be discussed subsequently in conjunction with FIG. 10. Suffice to say at this time that the medium may be any that is adapted for receiving the cubic sensor. Common examples thereof are water, the shallow and deep oceans, atmosphere, and space, although it is entirely conceivable that it is also possible to dispose it in some solids such as ice, plastics, or the like.

The system of FIG. 5 operates in the same manner as that of FIG. 3, inasmuch as the sensors are comparable, even though represented in block diagram form therein. However, multipliers 105 through 107 have been added thereto for the purpose of compensating for substantially infinite or at least high-impedance environments in which this system may be used to an advantage.

The system of FIG. 6 may be used in an environment where it is preferable to essentially stabilize the position of the electric field sensor. Thus, if electric field sensor 111 is to be located at some intermediate depth in the sea, lift device 112 would be designed as a suitable float and anchor 113 would be designed to either hook in the sea floor or hang suspended from sensor 111. Cables or any other suitable attaching means may be used to connect lift device 112 and anchor 113 to sensor 111. On the other hand, if sensor 111 is to be located in air, device 112 might be a balloon and anchor 113 an appropriate weight. Obviously, it would be well within the purview of one skilled in the art having the teaching presented herewith to select appropriate lift devices and anchors that would operate properly in the intended environmental medium.

In the event it is desired that the readout be remote from sensor 111, a long insulated electrical cable or other telemetering link 114 is used. Depending on the impedance of the environmental medium, multiplier 115 may be included, and so selector switch 116 is provided for that purpose. Readout 117, of course, is conventional and may be any type desired.

FIG. 7 shows a system that operates similar to those described above, but it also specifically teaches that the telemetering may be effected by means of radio or sonar, as any particular operational circumstances warrant.

The system of FIG. 8 likewise operates like the aforementioned systems, with the exception that a computer 133 is incorporated therein for the purpose of resolving the analog signals obtained from electric field sensor 131 into intelligible data that represents the field being measured. Obviously, it may be employed to make any other useful computations. Readout 134 is calibrated in terms and with indicia that would be significant to a human or other operator.

FIG. 9 depicts a system which may be employed to detect and measure the intrusion of an object within a given area of a predetermined environmental medium, such as water, sea water, air, space, or the like. It operates on the principle that the earth and its ambient environment contain or generate electric fields which may be detected and measured which are disturbed by the intrusion or presence of a foreign object therein. Hence, if the electric field of the earth is measured at any given location and a foreign object intrudes upon said location, the electric field and its vectoral components are changed in such manner that, with proper calibration, the changes thereof will indicate the type of object involved and the direction of its travel. In order to make such earth field measurements, however, it is necessary to use a plurality of electric field sensors which are disposed in a suitable array configuration to monitor the area under consideration or possibly being protected. Although the system of FIG. 9 only shows four of such electric field sensors, it should be understood that any number thereof may be similarly employed as the circumstances warrant.

From a practical operational standpoint, once the array of sensors has been located within the particular area of the environmental medium being watched, they each supply electrical signals to respective transmitters which, in turn, are connected to a like number of transmitting transducers for the broadcast thereof throughout the environmental medium which would most expeditiously transmit the signals. Said signals are, of course, received by a receiving transducer that is compatible with the aforementioned broadcasting transducer, and the signals thus received thereby are then filtered by a plurality of filters, the based frequency of which is designed to indicate which of the aforementioned electric field sensors for sensing an electric field has deviated from its normal condition as a result of the presence of or intrusion of the aforementioned foreign object. The outputs of said filters are then supplied to a receiver for suitable signal processing in order to make them more useful as inputs to either a readout directly or to a computer for suitable computations and readout.

Referring now to FIG. 10, there is illustrated a number of ways in which the subject invention may be used to obtain and supply information regarding the earth's electric or electromagnetic fields. For example, an aircraft 171 might be used to tow the subject sensor 172 through the atmosphere 173 to continuously measure the earth's electric field as it travels along. In another situation, a sensor 174 might be submerged from a buoy, float, or platform 175 which contains a transmitter 176 that is connected to sensor 174 for the purpose of broadcasting the electric field's sensed thereby in water 177 to some remote receiving station 178 on land 179. In addition, platform 175 might also have a receiving system 181 suspended therefrom, in order to act as one of the telemetering or communication relay components of a particular telemetering link. Still another application of the subject invention is to support a sensor 182 from a balloon 183 with a weight 184 connected to sensor 182 for the purpose of stabilizing it in space and thus prevent it from swinging unnecessarily. Still another possible circumstance which might include the subject invention to an advantage would be that where a submarine boat 185 tows a sensor 186 within the oceans 177. In such case, the associated apparatus such as the readout and the like would probably be disposed within the submarine boat, although it may be located at some other receiving point, if so desired. Still another possible use for the subject invention is to suspend a sensor 187 from a float 188 having sufficient buoyancy to hold sensor 187 in place within water 177 when it is anchored by a suitable anchor or weight 189 laying on the floor or sea floor 191 thereof. Another means of employing the invention to an advantage would be to tow a sensor 192 by means of a cable 193 which is attached to a ship 194. The associated apparatus may be, likewise, located within ship 194, or ship 194 may include a transmitting means 195 which acts as a relay station between it and the aforementioned remote receiving station 118 which, as previously mentioned, could possibly be located on land 179. Of course, when acting as a relay, a receiver 196 located within the water upon which ship 194 is traveling would thus cause it to act as a communication link between remote sonar and radio communications stations. Likewise, receiver 197 might also be connected by suitable electric cables 198 to receiver 178, even through the receiving station 197 may be located remote therefrom and possibly be disposed within sea water 177 or the like. As mentioned in conjunction with FIG. 9, an array 201 similar thereto may be located on the sea floor, in the event it is desired to determine whether or not the water above it is being intruded by a submarine, boat, ship, or any other foreign object. Said array could include a plurality of sensors 202 through 205 that are respectively connected to a transmitter 206 which, in turn, is connected to broadcast transducer 207.

Although each of the foregoing applications of the subject invention are indicated as being suitable to detect and readout the presence of foreign objects that may enter the area, it should be also understood that it is possible for them to act as detectors of marine mines 208 and 209, in the event that it is possible to measure the earth electric field at such locations both before and after the placement of said mines. Under such circumstances, obviously, it would be the deviation from the normal electric filed that would alert interested parties to the fact that certain objects, such as marine mines, had been placed nearby.

From the foregoing, it may readily be seen that the subject invention is exceedingly useful because it constitutes an advancement in the electric field sensing art which makes it more sensitive and accurate for many operational purposes.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope thereof.

What is claimed is:

1. A system for sensing and measuring an electric field within a predetermined environmental medium, comprising in combination:
    a first electrode disposed in said predetermined environmental medium in such manner that only one side thereof is in contact therewith;
    a second electrode spatially disposed from said first electrode and, likewise, disposed in predetermined environmental medium in such manner that only one side thereof is in contact therewith;
    means, having an input impedance substantially equal to the impedance of said environmental medium, connected between the sides of said first and second electrodes not in contact with said environmental medium for sensing the current flowing therebetween; and
    means connected to the output of said current-sensing means for reading out the current flowing therein.

2. The system of claim 1 wherein said means, having an input impedance substantially equal to the impedance of said environmental medium, connected between the sides of said first and second electrodes not in contact with said environmental medium for sensing the current comprises a differential amplifier.

3. The system of claim 1 wherein said means, having an input impedance substantially equal to the impedance of said environmental medium, connected between the sides of said first and second electrodes not in contact with said environmental medium for sensing the current comprises:
    a chopper;
    a transformer having a primary winding and a secondary winding, with the primary winding thereof connected to the output of said chopper;
    a variable gain amplifier connected to the secondary winding of said transformer; and
    a demodulator connected to the output of said variable gain amplifier.

4. The system of claim 1, wherein said first and second electrodes each comprises:
    an electrically nonconductive backing plate;
    an electrically conductive foil cemented to one side of said backing plate;
    a plurality of electrically conductive segments attached to said electrically conductive foil in such manner that an electric current would readily flow therebetween but in such spatial disposition that they are not in physical contact with each other; and
    insulated electrical conductor means extending through said electrically non conductive backing plate and electrically connected at one end thereof to the aforesaid electrically conductive foil.

5. The invention of claim 4 further characterized by means located in the spaces between said spatially disposed electrically conductive segments for the holding thereof in a predetermined geometrical configuration.

6. The invention of claim 1 further characterized by means effectively connected to said first and second electrodes for the holding of each thereof in a predetermined position relative to and at a predetermined distance from the other.

7. The invention of claim 6 wherein said means effectively connected to said first and second electrodes for the holding of each thereof in a predetermined position relative to and at a predetermined distance from the other comprises a frame having a cubic shape wherein the length, width, and depth dimensions thereof are equal and are substantially equal to the length and width dimensions of each of said first and second electrodes, with said first and second electrodes mounted in the opposite sides thereof in such manner that the sides of said first and second electrodes in contact with the aforesaid environmental medium face outwardly and in opposite directions.

8. A sensor for sensing an electric field within a predetermined environmental medium, comprising in combination:
    a watertight box frame having a cubic shape;
    a sextet of electrodes respectively mounted on the six sides of said box frame in such manner that only one side of each thereof is in contact with said environmental medium; and
    a trio of differential amplifiers, each of which has an input impedance substantially equal to that of the aforesaid environmental medium, respectively connected between oppositely disposed electrodes of a trio of pairs of electrodes constituting the aforesaid sextet of electrodes.

9. The system of claim 8 wherein each of said sextet of electrodes comprises:
    an electrically nonconductive baking plate;
    an electrically conductive foil cemented to one side of said backing plate;
    a plurality of electrically conductive segments attached to said electrically conductive foil in such manner that an electric current would readily flow therebetween but in such spatial disposition that they are not in physical contact with each other; and
    insulated electrical conductor means extending through said electrically nonconductive backing plate and electrically connected at one end thereof to the aforesaid electrically conductive foil.

10. The invention of claim 8 further characterized by a readout connected to the outputs of the aforesaid trio of differential amplifiers.

11. The invention of claim 10 further characterized by a telemetering link connected between the outputs of said trio of differential amplifiers and the input of the aforesaid readout.

12. The invention of claim 11 further characterized by a computer connected between the output of said telemetering link and the input of the aforesaid readout.

13. The invention of claim 11 further characterized by:
a selector switch having a pair of inputs and an output, with one of the inputs thereof connected to the output of said telemetering link;
a multiplier connected between the output of said telemetering link and the other input of said selector switch; and
a readout connected to the output of said selector switch.

14. The invention of claim 8 further characterized by:
a plurality of sensors for sensing an electric field within a predetermined environmental medium, each of which is substantially identical to the aforesaid sensor for sensing an electric field within a predetermined environmental medium, and each of which is spatially disposed relative to the others and the aforesaid sensor within said environmental medium in such manner as to form an array thereof having a predetermined geometrical configuration;
a readout; and
a telemetering link connected between the outputs of each of said sensors and the input of the aforesaid readout.

15. The invention of claim 14 further characterized by a computer connected between the output of said telemetering link and the input of said readout.

* * * * *